US010448560B2

(12) United States Patent
Connors et al.

(10) Patent No.: US 10,448,560 B2
(45) Date of Patent: Oct. 22, 2019

(54) MODULAR TOOLBAR WITH INTERNAL VACUUM

(71) Applicant: CNH Industrial America LLC, New Holland, PA (US)

(72) Inventors: Michael J. Connors, Lockport, IL (US); Brian J. Anderson, Yorkville, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 63 days.

(21) Appl. No.: 15/638,884

(22) Filed: Jun. 30, 2017

(65) Prior Publication Data
US 2019/0000009 A1 Jan. 3, 2019

(51) Int. Cl.
| *A01C 7/08* | (2006.01) |
|---|---|
| *A01C 7/20* | (2006.01) |
| *B23K 31/02* | (2006.01) |
| *B23K 101/06* | (2006.01) |
| *B23K 101/20* | (2006.01) |
| *B23K 101/28* | (2006.01) |

(52) U.S. Cl.
CPC .............. *A01C 7/082* (2013.01); *A01C 7/084* (2013.01); *A01C 7/208* (2013.01); *B23K 31/02* (2013.01); *A01C 7/081* (2013.01); *B23K 2101/06* (2018.08); *B23K 2101/20* (2018.08); *B23K 2101/28* (2018.08)

(58) Field of Classification Search
CPC ........... A01C 7/082; A01C 7/081; A01C 7/08; A01C 7/00; A01C 7/084; A01C 7/208; A01C 7/20; B23K 31/02; B23K 2101/20; B23K 2101/00; B23K 2101/06; B23K 2101/04; B23K 2101/28
See application file for complete search history.

(56) References Cited

U.S. PATENT DOCUMENTS

| 5,074,227 | A | 12/1991 | Schwitters |
|---|---|---|---|
| 7,104,204 | B2 | 9/2006 | McCartney |
| 7,665,409 | B2 | 2/2010 | Johnson |
| 9,173,338 | B2 | 11/2015 | Connors et al. |
| 9,363,943 | B2 | 6/2016 | Connors et al. |
| 9,615,497 | B2 | 4/2017 | Bassett et al. |
| 2014/0060867 | A1 | 3/2014 | Blunier et al. |
| 2014/0379230 | A1 | 12/2014 | Koch et al. |
| 2017/0000017 | A1 | 1/2017 | Johnson |
| 2017/0055438 | A1 | 3/2017 | Bruer et al. |

*Primary Examiner* — Christopher J. Novosad
(74) *Attorney, Agent, or Firm* — Rebecca L. Henkel; Rickard K. DeMille

(57) ABSTRACT

A planting implement including a first hollow support frame member having a first end and a first end plate connected to the first end. The first end plate has a first hole disposed therein. The planting implement also includes a second hollow support frame member configured for coupling to the first hollow support frame member. The second hollow support frame member has a second end and a second end plate connected to the second end. The second end plate has a second hole disposed therein. The planting implement further includes at least one spacer and at least one seal having an aperture. The at least one seal is configured to seal a connection between the first hollow support frame member and the second hollow support frame member such that a pneumatic pathway is established between the first hollow support frame member and the second hollow support frame member.

12 Claims, 2 Drawing Sheets

MODULAR TOOLBAR WITH INTERNAL VACUUM

BACKGROUND OF THE INVENTION

1. Field of the Invention

The present invention relates to agricultural implements, and, more particularly, to agricultural planters which include air pressure control systems.

2. Description of the Related Art

Agricultural planting implements (e.g., planters) are commonly used to plant rows of seeds in soil. Typically, modern planting implements may include a chassis that carries one or more main seed hoppers that provide seed (or other granular product) in an air stream to multiple auxiliary seed hoppers that are associated with one or more seed dispensing row units which are distributed across the width of the implement. Generally, the agricultural planter may also include a pneumatic system carried by the chassis that supplies positive or negative pressurized air to transport the seeds or other particulate from the storage tanks to the row units. Planting implements may be towed by a hitch mechanism that attaches to a tractor or other agricultural vehicle.

The pneumatic system may include an inductor box positioned beneath the main seed tank. The inductor box is configured to receive seeds from the tank, fluidize the seeds into an air/seed mixture, and distribute the air/seed mixture to the row units via a network of pneumatic hoses and/or conduits. To provide a vacuum force in the row units, it is also known to seal and provide a vacuum within the toolbar. For example, U.S. Pat. No. 9,363,943, owned by CNH Industrial LLC, discloses a self-aligning head bracket to establish a pneumatic path between the interior of the toolbar and each row unit coupled to the toolbar.

Row units are configured to dispense seeds at a desired depth beneath the soil surface. Typically, the row units are laterally arranged along a length of the toolbar at predefined intervals. To plant seeds, the row units perform four main operations as they are pulled: opening a trench in the soil, placing a seed into the formed trench at appropriate intervals, closing the formed trench to put soil on top of the placed seed, and packing soil on top of the seed to provide desirable soil contact with the placed seed. To open a trench in the soil, a furrowing disc system, also called an opening disc, cuts into the soil and dislocates soil as it rotates to form the trench. Once the trench is open, a seed is placed in the trench by a metering device which receives seeds from the main storage tank(s) or a row unit storage tank. The metering device typically utilizes a combination of differential air pressure, which selects the seed, and gravity in order to place the seed in the trench at predefined intervals. One or more closing discs and a pressing wheel carried behind the closing disc(s) covers the trench and packs soil on top of the seed. By having multiple row units working in unison as the planter is pulled across a field, many seeds can be effectively planted in an efficient manner.

In some planting applications it may be advantageous to adjust the configuration of the agricultural planting implement. For example, the number and/or spacing of the row units may be adjusted depending upon the type of crop being planted. Also, for example, it may be advantageous to have a first group of row units that plant a particular crop material (e.g. corn) and a second group of row units that plant a different kind of crop material (e.g. soybeans). However, adjusting the number and/or spacing of the row units can be an arduous, cumbersome, and time consuming process. For instance, the row units, the securing brackets, and/or the vacuum hoses may all need to be adjusted. This increases the tooling and costs associated with adjusting the agricultural planting implement.

What is needed in the art is a cost-effective adjustment apparatus and method to adjust the configuration of an agricultural planting implement.

SUMMARY OF THE INVENTION

The present invention provides a modular toolbar that enables an operator or mechanic to quickly and cost-effectively adjust the number of row units and/or support wheels of an agricultural planting implement.

The invention in one form is directed to a planting implement including a first hollow support frame member having a first end and a first end plate connected to the first end. The first end plate has a first hole disposed therein. The planting implement also includes a second hollow support frame member configured for coupling to the first hollow support frame member. The second hollow support frame member has a second end and a second end plate connected to the second end. The second end plate has a second hole disposed therein. The planting implement further includes at least one spacer located in between the first end plate and the second end plate. The spacer has an aperture. The planting implement further includes at least one seal having an aperture and configured to seal a connection between the first hollow support frame member and the second hollow support frame member such that a pneumatic pathway is established between the first hollow support frame member and the second hollow support frame member.

The invention in another form is directed to a method of modifying a planting implement. The method includes the steps of providing a first hollow support frame member having a first end and a second hollow support frame member having a second end and configured for coupling to the first hollow support frame member. The method also includes connecting a first end plate to the first end of the first hollow support frame member. The first end plate has a first hole disposed therein. The method also includes connecting a second end plate to the second end of the second hollow support frame member. The second end plate has a second hole disposed therein. The method also includes positioning at least one spacer in between the first end plate and the second end plate. The spacer has an aperture. The method also includes positioning at least one seal in between the first end plate and the second end plate. The at least one seal has an aperture and is configured to seal a connection between the first hollow support frame member and the second hollow support frame member. The method includes the further step of fastening the first hollow support frame member and the second hollow support frame member together such that a pneumatic pathway is established between the first hollow support frame member and the second hollow support frame member.

An advantage of the present invention is that an extra row unit may be expeditiously and cost-effectively added to an existing planting implement.

Another advantage of the present invention is that it reduces tooling and the cost involved in modifying a planting implement.

Yet a further advantage of the present invention is that the toolbar may still be used as the source of the vacuum pressure upon adding additional row units.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
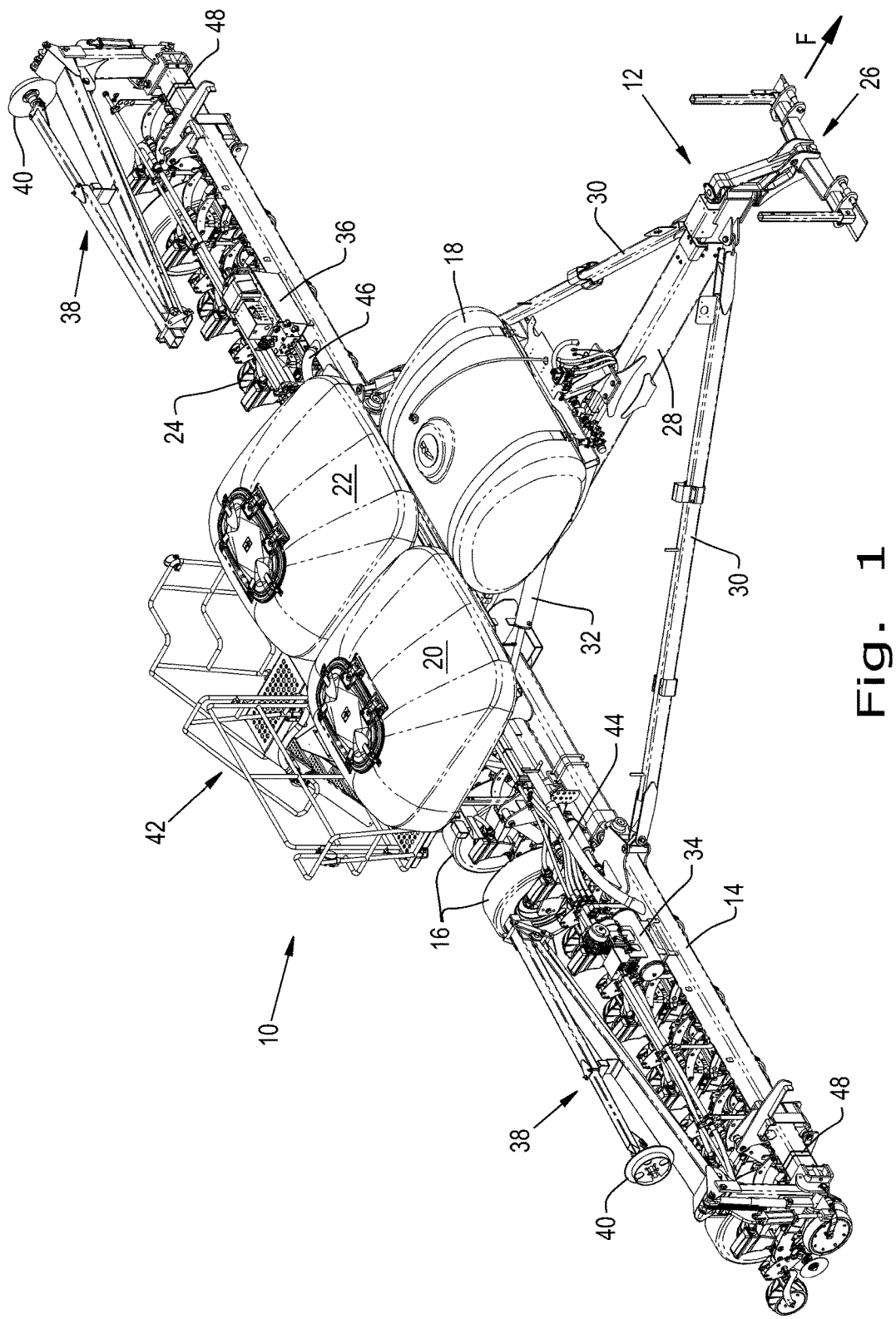
FIG. 1 is a perspective view of a planting implement according to the present invention.

Referring now to the drawings, and more particularly to FIG. 1, there is shown an embodiment of a planting implement 10, e.g., a planter, according to the present invention which generally includes a hitch assembly 12 at a front of the planter 10 that is connected to a modular toolbar 14. The modular toolbar 14, which may be in the form of a hollow support beam, is configured to increase the planting efficiency of the planter 10 and provide an internal pneumatic pressure, such as a vacuum.

The planter 10 may also include wheels 16 carried by the chassis near a rear of the planter 10, a chemical tank 18, one or more seed storage tanks 20, 22 that can be filled with seed, and a plurality of row units 24 connected to the toolbar 14 and arranged laterally across a length of the toolbar 14. The hitch assembly 12 can include a hitch 26 configured to be connected to a tractor or other agricultural implement (not shown) so that the planter 10 can be pulled in a forward direction of travel "F". The hitch 26 can be integrally formed with or connected to a hitch bar 28 that is connected to the modular toolbar 14 by bracing bars 30 and one or more cylinders 32. The planter 10 may also include an air compressor system 34 and an electric generator 36 that are each connected to the modular toolbar 14. The planter 10 has various hydraulic, pneumatic, and electrical lines to support various cylinders and systems that are included on the planter 10. A marking device 38 which includes a marking disc 40 may be connected to each lateral end of the modular toolbar 14. The marking device 38 may extend outward to create a line in the soil as the planter 10 is pulled, thereby helping an operator position the planter 10 in creating subsequent rows. A stair assembly 42 can be mounted to the back of the planter 10.

The row units 24 facilitate the planting of the rows of seeds by depositing the seeds at a desired depth beneath the soil surface as the planter 10 moves forwardly in the direction of travel F. The row units 24 may deposit the seeds by vacuum pressure, which enables the row units 24 to control the seed flow rate and the spacing between the seeds as they are planted. The row units 24 may be operably coupled to a pressure differential system, which may include one or multiple vacuum sources that may be positioned along the length of the toolbar 14 or underneath the storage tanks 20, 22. The vacuum source may be in the form of a fan or blower such as disclosed in U.S. Pat. No. 7,665,409 or 9,363,943, which are both commonly owned by CNH Industrial LLC and incorporated herein by reference. The vacuum source is operatively coupled to the modular toolbar 14 via hose lines 44, 46, which supply the necessary vacuum force within the modular toolbar 14. In turn, each row unit 24 draws the requisite vacuum force from the modular toolbar 14 that is needed to operate its seed metering device. The planter 10 may have numerous configurations of row units 24 such as 6, 12, 24, 32, or more row units 24. Additionally, the spacing of the row units 24 may be adjusted depending upon the crop material being planted. For example, the row units 24 may be spaced apart by 30 inches when planting corn or 15 inches when planting soy beans. It should be appreciated that in some embodiments, one group of row units 24 may be used to deposit a first type of crop material (e.g., corn) and another group of row units 24 may be used to deposit a second type of crop material (e.g., soy beans). For instance, there may be a group of 16 row units 24 that plant corn (mounted directly to the toolbar 14) and an offset group of 15 row units 24 that plant beans (spaced rearward to allow residue flow). The planter 10 may also include two separate groups of 16 row units that plant the same or a different crop material.

Figure 2:
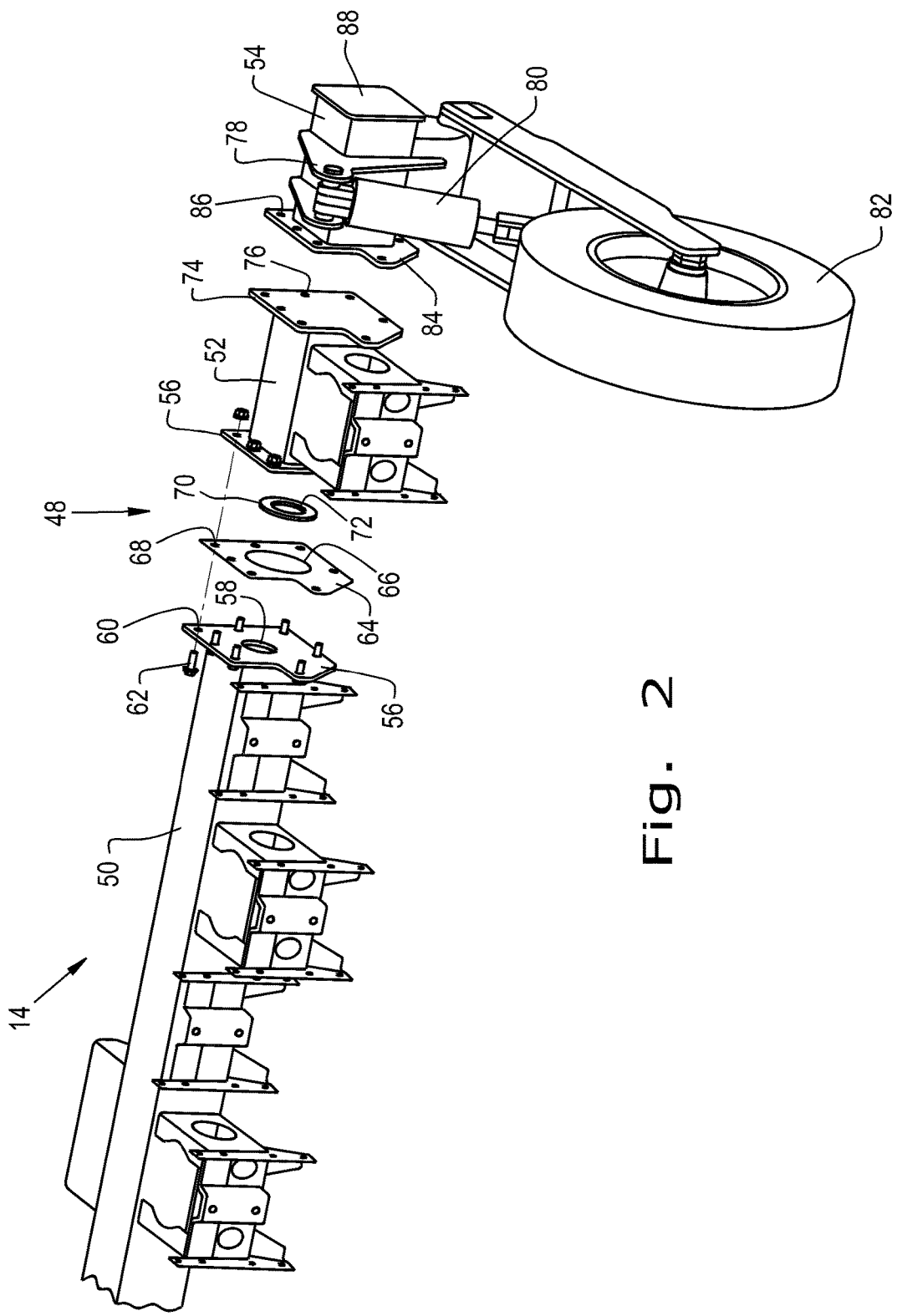
FIG. 2 is an end exploded view of another embodiment of a planting implement with an accompanying wheel module according to the present invention.

Referring now to FIG. 2, there is shown an exploded view of the modular toolbar 14 at a connection point 48 between a main toolbar section 50 and an additional tool bar section 52 of the modular toolbar 14 according to the present invention. The modular toolbar 14 may include a right and left main toolbar section 50, one or more additional toolbar section(s) 52 with one or more row unit(s) 24 coupled thereto, and/or a wheel module 54 coupled to either toolbar section 50, 52. The modular toolbar 14 allows an operator to expeditiously and cost-effectively adjust the planter 10 by adding or subtracting row units 24, while still maintaining the internal vacuum force within the modular toolbar 14.

The toolbar sections 50, 52 may each include mounts, apertures, hoses, and/or fasteners for securing and fluidly connecting the row units 24 (not shown in FIG. 2). The toolbar sections 50, 52 may be in the form of hollow support beams that are composed of any suitable material such as metal. The main toolbar section 50 and the additional toolbar section(s) 52 generally each include an end plate 56 that connects to the respective mating ends of the main toolbar section 50 and additional toolbar section(s) 52. The end plate 56 has a hole 58, which may be located near the middle of the end plate 56. The end plate 56 also has numerous through-holes 60 around its perimeter for receiving fasteners 62 therethrough. The fasteners 62 may be in the form of known screws, bolts and nuts, etc.

In order to sealingly couple the additional toolbar section(s) 52 to the main toolbar section 50, the planter 10 may include one or more spacer(s) 64 that are located in between the respective end plates 56 of the additional toolbar section(s) 52 and the main toolbar section 50. As shown, in the present invention there is one spacer 64 in between the end plates 56. The spacer 64 includes an aperture 66 which may be located at the center of the spacer 64 and positioned substantially concentric with the holes 58 of the end plates 56. The aperture 66 may be larger than the holes 58 of the endplates 56. The spacer 64 may be in the form of a non-compressible spacer that acts a compression limiter. In the present embodiment, the spacer 64 is in the form of a metal plate. However, the spacer 64 may be composed of any suitable material such as a metal, an alloy, a polymer, etc. The spacer 64 may additionally include through-holes 68 for the fasteners 62 to pass therethrough upon coupling the additional toolbar section(s) 52 and the main toolbar section 50 together. The shape of the spacer 64 may substantially match the shape of the end plates 56. It should be appreciated that the spacer 64 may be of a different shape and may be welded onto either end plate 56 instead of including through-holes 68.

Additionally, the planter 10 may include one or more seal(s) 70 configured to seal the connection between the additional toolbar section(s) 52 and the main toolbar section 50. In the present embodiment, the planter 10 includes one seal 70 that has an aperture 72. Instead of one seal 70 there may be multiple seals 70 that seal the main toolbar section 50 and the additional toolbar section 52 together. As can be seen, the diameter of the aperture 66 of the spacer 64 is larger than the diameter of the seal 70 such that the seal 70 may substantially fit within the aperture 66 of the spacer 64. In this regard, the outer peripheral surface of the seal 70 may completely contact and seal the inner peripheral surface of the spacer 64. The seal 70 may be in the form of a compressible seal such as a circular gasket 70. The seal 70 may be composed of any suitable material such as a plastic, a polyurethane, a rubber, etc. The thickness of the seal 70 may be greater than the thickness of the spacer 64. It should be appreciated that the thickness of the seal 70 may be selected based upon the desired compression limit of the seal 70.

Upon fastening the additional toolbar section 52 and the main toolbar section 50 together, the respective holes 58 of the end plates 56 and aperture 72 substantially align in order to establish a pneumatic pathway between the main toolbar section 50 and the additional toolbar section 52. Thereby, the connection point 48 does not leak and the vacuum pressure throughout the toolbar sections 50, 52 is maintained.

The additional toolbar section 52 is shown to be configured to attach a single row unit 24. However, the additional toolbar section(s) 52 may include one or more row units 24. For example, one additional toolbar section 52 may include two, three, four, or more row units 24. Additionally, multiple additional toolbar sections 52 may be coupled to one another. As shown, the distal end of the additional toolbar section 52 has a closed end plate 74 with through-holes 76. However, if multiple additional toolbar sections 52 are coupled to one another, each mating end of the additional toolbar sections 52 may include end plates 56 with holes 58. These connection points may include spacers 64 and seals 70, as discussed above, in order to maintain the vacuum force within the multiple additional toolbar sections 52.

The wheel module 54 may be coupled to the end of the main toolbar section 50 or to the distal end of the additional toolbar section 52 (FIG. 2). Alternatively, the wheel module 54 may not be included on the planting implement 10 (FIG. 1). The wheel module 54 may include a support frame 78, an actuator 80 to adjust the height of its wheel 82, a proximal end plate 84 with through-holes 86, and a distal end plate 88. The proximal end plate 84 may couple to the end plate 74 of the additional toolbar section 52 via known fasteners. The wheel module 54 is not shown to include an internal vacuum force, and thus the connection point of the wheel module 54 does not include holes, spacers, and gaskets. However, it should be appreciated that the wheel module 54 may include an internal vacuum force and thereby its connection point to either of the toolbar sections 50, 52 may include endplates 56, spacers 64, and seals 70 in order to maintain the internal vacuum force. For example, it is conceivable to couple the wheel module 54 in between two additional toolbar sections 52 (not shown).

The method of modifying the planting implement 10 includes the steps of providing the modular toolbar 14 that includes the main toolbar section 50 and the additional toolbar section 52. The end plates 56 may be connected, for example welded, onto the main toolbar section 50 and the additional toolbar section 52. The spacer 64 may be positioned in between the main toolbar section 50 and the additional toolbar section 52. The seal 70 may be positioned in between the end plates 56. Then, the main toolbar section 50 and the additional toolbar section 52 may be fastened together as described above. Thus, the pneumatic pathway is established between the main toolbar section 50 and the additional toolbar section 52. This method enables an operator or mechanic to efficiently add row units 24 to an existing planting implement 10 in the field or in the manufacturing plant.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A planting implement, comprising:
a plurality of row units; and
a modular toolbar which mounts and supports said plurality of row units, said modular toolbar comprising:
a first hollow support frame member configured for supporting said plurality of row units, said first hollow support frame member having a first end and a first end plate connected to the first end, said first end plate having a first hole disposed therein;
a second hollow support frame member configured for coupling to said first hollow support frame member, said second hollow support frame member having a second end and a second end plate connected to the second end, said second end plate having a second hole disposed therein;
at least one spacer located in between said first end plate and said second end plate, said at least one spacer having an aperture; and
at least one seal having an aperture and configured to seal a connection between said first hollow support frame member and said second hollow support frame member such that a pneumatic pathway is established between said first hollow support frame member and said second hollow support frame member.

2. The planting implement of claim 1, further including an air pressure differential system operatively coupled to the first hollow support frame member such that a vacuum force is present in said first hollow support frame member and said second hollow support frame member.

3. The planting implement of claim 1, wherein said second hollow support frame member includes at least one row unit.

4. The planting implement of claim 1, further including a wheel module coupled to said second hollow support frame member.

5. The planting implement of claim 1, wherein said aperture of said at least one spacer has a diameter that is larger than a diameter of said at least one seal.

6. The planting implement of claim 5, wherein said at least one seal substantially fits within said aperture of said at least one spacer.

7. The planting implement of claim 1, wherein said at least one spacer is in the form of at least one non-compressible spacer.

8. The planting implement of claim 1, wherein said at least one seal is in the form of at least one compressible seal.

9. The planting implement of claim 8, wherein said at least one seal is in the form of at least one gasket.

10. The planting implement of claim 8, wherein said at least one compressible seal has a thickness that is greater than a thickness of said at least one spacer.

11. The planting implement of claim 1, wherein said first and second end plates each include a plurality of through-holes, and said at least one spacer includes a plurality of through-holes corresponding to said plurality of through-holes of each of said first and second endplates.

12. The planting implement of claim 11, wherein said first and second hollow support frame members are coupled to one another by a plurality of fasteners extending through said plurality of through-holes of said first and second end plates and said plurality of through-holes of said at least one spacer.

* * * * *